(12) United States Patent
Colgrove et al.

(10) Patent No.: US 11,203,678 B2
(45) Date of Patent: Dec. 21, 2021

(54) THERMOPLASTIC COMPOSITIONS, METHODS, APPARATUS, AND USES

(71) Applicant: Derrick Corporation, Buffalo, NY (US)

(72) Inventors: James R. Colgrove, East Aurora, NY (US); Keith Wojciechowski, Lakeview, NY (US)

(73) Assignee: DERRICK CORPORATION, Buffalo, NY (US)

( * ) Notice: Subject to any disclaimer, the term of this patent is extended or adjusted under 35 U.S.C. 154(b) by 349 days.

(21) Appl. No.: 15/965,363

(22) Filed: Apr. 27, 2018

(65) Prior Publication Data

US 2018/0312667 A1  Nov. 1, 2018

Related U.S. Application Data

(60) Provisional application No. 62/500,262, filed on May 2, 2017, provisional application No. 62/492,054, filed on Apr. 28, 2017.

(51) Int. Cl.
*B01D 21/00* (2006.01)
*B01D 39/00* (2006.01)
(Continued)

(52) U.S. Cl.
CPC .............. *C08K 7/14* (2013.01); *B01D 21/283* (2013.01); *B01D 39/1623* (2013.01); *B07B 1/00* (2013.01);
(Continued)

(58) Field of Classification Search
CPC .............. B01D 2313/26; B01D 21/283; B01D 39/1623; C08K 7/14; C08K 5/1345;
(Continued)

(56) References Cited

U.S. PATENT DOCUMENTS 3,002,623 A   10/1961   Fontaine
3,364,503 A   1/1968   Mustee
(Continued)

FOREIGN PATENT DOCUMENTS

CA   1293223   12/1991
CA   2269314   10/2000
(Continued)

OTHER PUBLICATIONS

Multotec, Injection Moulded Polywedge Screen Panels, (Rev. 4), www.multotec.com.
(Continued)

*Primary Examiner* — Michael L Leonard
(74) *Attorney, Agent, or Firm* — Jason P. Mueller; FisherBroyles, LLP

(57) ABSTRACT

Thermoplastic polyurethane (TPU) compositions, methods for producing TPU compositions, methods of using TPU compositions, and apparatuses produced therefrom are disclosed. Disclosed TPU compositions include a thermoplastic polyurethane polymer, a heat stabilizer, a flow agent, and a filler material. The filler may be a glass fiber. Disclosed TPU compositions have improved thermal stability and improved flow properties suitable for injection molding of articles of manufacture having a large plurality of fine openings or pores. Articles produced from the composition have superior thermal stability, abrasion resistance, and chemical resistance. Example articles include screening members for vibratory screening machines.

27 Claims, 6 Drawing Sheets

(51) Int. Cl.

| | | |
|---|---|---|
| C08K 7/14 | (2006.01) |
| C08K 5/20 | (2006.01) |
| C08G 18/10 | (2006.01) |
| C08G 18/76 | (2006.01) |
| B01D 21/28 | (2006.01) |
| B29B 7/90 | (2006.01) |
| B29C 45/00 | (2006.01) |
| B29C 45/40 | (2006.01) |
| C08K 5/134 | (2006.01) |
| B29B 9/14 | (2006.01) |
| C08G 18/42 | (2006.01) |
| C08G 18/08 | (2006.01) |
| C08G 18/44 | (2006.01) |
| C08G 18/32 | (2006.01) |
| C08G 18/48 | (2006.01) |
| B07B 1/46 | (2006.01) |
| B07B 1/00 | (2006.01) |
| B29D 28/00 | (2006.01) |
| B01D 39/16 | (2006.01) |
| B29L 31/00 | (2006.01) |
| B29K 75/00 | (2006.01) |
| B29K 105/00 | (2006.01) |
| B29K 509/08 | (2006.01) |
| B29B 7/48 | (2006.01) |
| B29B 7/18 | (2006.01) |
| B29B 9/06 | (2006.01) |

(52) U.S. Cl.
CPC .............. *B07B 1/4618* (2013.01); *B29B 7/90* (2013.01); *B29B 9/14* (2013.01); *B29C 45/0001* (2013.01); *B29C 45/40* (2013.01); *B29D 28/00* (2013.01); *C08G 18/0895* (2013.01); *C08G 18/10* (2013.01); *C08G 18/3203* (2013.01); *C08G 18/3225* (2013.01); *C08G 18/42* (2013.01); *C08G 18/4277* (2013.01); *C08G 18/44* (2013.01); *C08G 18/48* (2013.01); *C08G 18/7614* (2013.01); *C08K 5/1345* (2013.01); *C08K 5/20* (2013.01); *B01D 2313/16* (2013.01); *B29B 7/183* (2013.01); *B29B 7/48* (2013.01); *B29B 9/06* (2013.01); *B29K 2075/00* (2013.01); *B29K 2105/0044* (2013.01); *B29K 2509/08* (2013.01); *B29L 2031/737* (2013.01); *C08G 2120/00* (2013.01); *C08G 2340/00* (2013.01); *C08K 2201/003* (2013.01); *C08K 2201/004* (2013.01)

(58) Field of Classification Search
CPC ...... C08K 5/20; C08G 18/0895; C08G 18/10; C08G 18/3203; C08G 18/3225; C08G 18/42; C08G 18/4277; C08G 18/44; C08G 18/48; C08G 18/7614
See application file for complete search history.

(56) References Cited

U.S. PATENT DOCUMENTS

| | | |
|---|---|---|
| 3,377,322 A | 4/1968 | Kenneth |
| 3,390,771 A | 7/1968 | Wehner |
| 3,401,800 A | 9/1968 | Stock |
| 3,713,541 A | 1/1973 | Nelson |
| 4,028,230 A | 6/1977 | Rosenblum |
| 4,100,248 A | 7/1978 | Adams |
| 4,141,821 A | 2/1979 | Wolff |
| 4,184,944 A | 1/1980 | Tytko |
| 4,188,208 A | 2/1980 | Guay |
| 4,190,527 A | 2/1980 | Spiller |
| 4,222,865 A | 9/1980 | Valeri et al. |
| 4,265,742 A | 5/1981 | Bucker |
| 4,361,239 A | 11/1982 | Kumandan |
| 4,383,919 A | 5/1983 | Schmidt |
| 4,452,656 A | 6/1984 | Benson et al. |
| 4,526,682 A | 7/1985 | Wallace |
| 4,569,761 A | 2/1986 | Spiewok et al. |
| 4,674,251 A | 6/1987 | Wolff |
| 4,819,809 A | 4/1989 | Derrick |
| 4,857,176 A | 8/1989 | Derrick et al. |
| 4,882,054 A | 11/1989 | Derrick et al. |
| 4,885,040 A | 12/1989 | Wolff |
| 4,932,112 A | 6/1990 | Tikkanen |
| 4,986,900 A | 1/1991 | Mason |
| 5,073,254 A | 12/1991 | Beisenherz et al. |
| 5,149,739 A * | 9/1992 | Lee .................... C08L 75/04 524/504 |
| 5,238,117 A | 8/1993 | Hunter |
| 5,282,538 A | 2/1994 | Moys |
| 5,332,101 A | 7/1994 | Bakula |
| 5,372,261 A | 12/1994 | Galton et al. |
| 5,378,364 A | 1/1995 | Welling |
| 5,385,669 A | 1/1995 | Leone, Sr. |
| 5,437,374 A | 8/1995 | Bills et al. |
| 5,472,096 A | 12/1995 | Prinsloo |
| 5,558,042 A | 9/1996 | Bradley et al. |
| 5,575,618 A | 11/1996 | Brandon et al. |
| 5,626,234 A | 5/1997 | Cook |
| 5,672,267 A | 9/1997 | Terblanche |
| 5,816,413 A | 10/1998 | Boccabella et al. |
| 5,868,260 A | 2/1999 | Bosman et al. |
| 5,876,552 A | 3/1999 | Bakula |
| 5,971,159 A | 10/1999 | Leone et al. |
| 6,033,564 A | 3/2000 | Kirker et al. |
| 6,050,423 A | 4/2000 | Dunnuck et al. |
| 6,092,667 A | 7/2000 | Steinmuller et al. |
| 6,253,926 B1 | 7/2001 | Woodgate |
| 6,267,246 B1 | 7/2001 | Russel et al. |
| 6,318,565 B1 | 11/2001 | Diemer et al. |
| 6,431,366 B2 | 8/2002 | Fallon |
| 6,461,499 B1 | 10/2002 | Bosman |
| 6,530,484 B1 | 3/2003 | Bosman |
| 6,564,947 B2 | 5/2003 | Bakula |
| 6,565,698 B1 | 5/2003 | Adams |
| 6,669,027 B1 | 12/2003 | Mooney et al. |
| 6,715,613 B2 | 4/2004 | Eeles |
| 6,759,000 B2 | 7/2004 | Cook et al. |
| 6,820,748 B2 | 11/2004 | Fallon |
| 6,915,910 B2 | 7/2005 | Lutz et al. |
| 7,000,777 B2 | 2/2006 | Adams et al. |
| 7,063,214 B2 | 6/2006 | Schulte |
| 7,090,083 B2 | 8/2006 | Russel |
| 7,216,768 B2 | 5/2007 | Fisher et al. |
| 7,228,971 B2 | 6/2007 | Mooney et al. |
| 7,389,882 B2 | 6/2008 | Cady et al. |
| 7,413,087 B2 | 8/2008 | Kriel |
| 7,467,715 B2 | 12/2008 | Johnson et al. |
| 7,484,625 B2 | 2/2009 | Scott et al. |
| 7,578,394 B2 | 8/2009 | Wojciechowski et al. |
| 7,654,395 B2 | 2/2010 | Johnson et al. |
| 7,735,656 B1 | 6/2010 | Bassler |
| 7,810,649 B2 | 10/2010 | Robertson |
| 7,819,254 B2 | 10/2010 | Robertson |
| 7,819,255 B2 | 10/2010 | Cady |
| 7,909,172 B2 | 3/2011 | Carr |
| 7,942,353 B2 | 5/2011 | Cerra et al. |
| 7,959,009 B2 | 6/2011 | Weaver |
| 7,992,719 B2 | 8/2011 | Carr et al. |
| 8,025,154 B2 | 9/2011 | Kriel |
| 8,113,357 B2 | 2/2012 | Johnson |
| 8,127,932 B2 | 3/2012 | Trench |
| 8,371,450 B2 | 2/2013 | McGregor et al. |
| 8,393,474 B2 | 3/2013 | Robertson |
| 8,408,397 B2 | 4/2013 | Cady |
| 8,439,203 B2 | 5/2013 | Wojciechowski et al. |
| 8,443,984 B2 | 5/2013 | Wojciechowski et al. |
| 8,544,655 B2 | 10/2013 | Trench |
| 8,584,866 B2 | 11/2013 | Lipa et al. |
| 8,596,464 B2 | 12/2013 | Robertson |
| 8,827,545 B2 | 9/2014 | Kalidindi |

(56) References Cited

U.S. PATENT DOCUMENTS

| | | |
|---|---|---|
| 9,010,539 B2 | 4/2015 | Lipa et al. |
| 9,050,607 B2 | 6/2015 | Heley et al. |
| 9,056,335 B2 | 6/2015 | Wojciechowski et al. |
| 9,149,841 B2 | 10/2015 | Ghosh |
| 9,156,061 B2 | 10/2015 | Robertson |
| 9,180,493 B2 | 11/2015 | Dahl |
| 9,327,318 B2 | 5/2016 | Paul |
| 9,364,864 B2 | 6/2016 | Paul |
| 9,375,756 B2 | 6/2016 | Lipa et al. |
| 9,403,192 B2 | 8/2016 | Lipa et al. |
| 9,409,209 B2 | 8/2016 | Wojciechowski |
| 9,610,614 B2 | 4/2017 | Woodgate et al. |
| 9,744,564 B2 | 8/2017 | Cady |
| 9,884,344 B2 | 2/2018 | Wojciechowski |
| 9,908,150 B2 | 3/2018 | Lipa et al. |
| 10,046,363 B2 | 8/2018 | Wojciechowski |
| 10,086,408 B2 | 10/2018 | Cady et al. |
| 10,259,013 B2 | 4/2019 | Wojciechowski |
| 10,363,576 B2 | 7/2019 | Schenk |
| 2002/0033358 A1 | 3/2002 | Bakula |
| 2002/0112998 A1 | 8/2002 | Bosman |
| 2002/0153287 A1 | 10/2002 | Fallon |
| 2003/0153402 A1 | 8/2003 | Simonds et al. |
| 2004/0211707 A1 | 10/2004 | Lipa |
| 2005/0133465 A1 | 6/2005 | Derrick et al. |
| 2005/0183991 A1 | 8/2005 | Kriel |
| 2005/0274653 A1 | 12/2005 | LeVeine et al. |
| 2007/0151920 A1 | 7/2007 | Kay |
| 2007/0187302 A1 | 8/2007 | Parra Huerta |
| 2007/0195143 A1 | 8/2007 | Andrews |
| 2008/0078703 A1 | 4/2008 | Robertson |
| 2008/0121568 A1 | 5/2008 | McGregor et al. |
| 2009/0139909 A1 | 6/2009 | Robertson |
| 2009/0166268 A1 | 7/2009 | Malmberg |
| 2009/0301945 A1 | 10/2009 | Trench et al. |
| 2009/0321328 A1 | 12/2009 | Wojciechowski et al. |
| 2010/0270215 A1 | 10/2010 | Robertson et al. |
| 2010/0276343 A1 | 11/2010 | Hukki |
| 2011/0094950 A1 | 4/2011 | Dahl |
| 2011/0139688 A1 | 6/2011 | Carr et al. |
| 2011/0155653 A1 | 6/2011 | Robertson et al. |
| 2011/0306719 A1* | 12/2011 | Hilmer ............... C08G 18/7664 524/539 |
| 2012/0006735 A1 | 1/2012 | Ralph |
| 2012/0080362 A1 | 4/2012 | Trench et al. |
| 2013/0168387 A1 | 7/2013 | Carvajal et al. |
| 2013/0240652 A1 | 9/2013 | Gardner et al. |
| 2013/0277281 A1 | 10/2013 | McClung, III |
| 2013/0277282 A1 | 10/2013 | Lipa et al. |
| 2013/0313168 A1 | 11/2013 | Wojciechowski |
| 2014/0262978 A1* | 9/2014 | Wojciechowski .... B07B 1/4618 209/397 |
| 2014/0327171 A1 | 11/2014 | Thierry et al. |
| 2014/0342110 A1* | 11/2014 | Zhu ................... C08G 18/7614 428/36.9 |
| 2015/0197827 A1 | 7/2015 | Perkins |
| 2015/0210799 A1 | 7/2015 | Tanaka |
| 2015/0239014 A1 | 8/2015 | Lipa et al. |
| 2015/0283583 A1 | 10/2015 | Woodgate |
| 2016/0101377 A1 | 4/2016 | Cady |
| 2016/0129477 A1 | 5/2016 | Racherla |
| 2016/0303611 A1 | 10/2016 | Lipa et al. |
| 2018/0185879 A1 | 7/2018 | Torres Jara |
| 2018/0185880 A1 | 7/2018 | Wojciechowski |
| 2018/0243797 A1 | 8/2018 | Wojciechowski |
| 2018/0312667 A1 | 11/2018 | Colgrove et al. |
| 2018/0345319 A1 | 12/2018 | Colgrove et al. |
| 2019/0076881 A1 | 3/2019 | Colgrove et al. |
| 2019/0329293 A1 | 10/2019 | Colgrove et al. |
| 2020/0190768 A1 | 6/2020 | Cangini |

FOREIGN PATENT DOCUMENTS

| | | |
|---|---|---|
| CL | 2012002918 | 5/2013 |
| CL | 2015002761 | 11/2016 |
| CL | 2016000531 | 11/2016 |
| CL | 2016001804 | 12/2016 |
| CN | 101716573 | 6/2010 |
| CN | 20185517 | 6/2011 |
| CN | 103819891 A | 5/2014 |
| CN | 104755521 A | 7/2015 |
| CN | 106255556 A | 12/2016 |
| DE | 2924571 | 1/1981 |
| DE | 3542635 | 2/1987 |
| DE | 102009010684 | 9/2010 |
| DE | 102011119344 A1 | 4/2013 |
| DE | 102014009702 | 8/2015 |
| EA | 15159 | 6/2011 |
| EA | 201170173 A1 | 6/2011 |
| EM | 00076997-0001 | 8/2007 |
| EM | 001153464-0003 | 9/2009 |
| EM | 002241158-0002 | 5/2013 |
| EM | 002303412-0012 | 5/2013 |
| EM | 002667436-0001 | 3/2015 |
| EM | 004496263-0002 | 6/2017 |
| EP | 1205265 | 5/2002 |
| GB | 2185698 A | 7/1987 |
| GB | 2203061 | 12/1988 |
| GB | 2497873 | 6/2013 |
| JP | 2008-255145 | 10/2008 |
| KR | 20-0191289 | 8/2000 |
| KR | 10-2014-027283 | 3/2014 |
| RU | 2241550 | 12/2004 |
| RU | 2296630 C2 | 4/2007 |
| RU | 2361684 | 7/2009 |
| RU | 2543393 | 2/2015 |
| RU | 2615137 | 4/2017 |
| SU | 1599133 A1 | 10/1990 |
| TW | M258183 U | 3/2005 |
| TW | M328904 U | 3/2008 |
| TW | M340860 U | 9/2008 |
| TW | 200925535 A | 6/2009 |
| TW | M447274 U | 2/2013 |
| TW | M459903 U | 8/2013 |
| TW | M468568 U | 12/2013 |
| TW | M470701 U | 1/2014 |
| TW | M481766 U | 7/2014 |
| TW | M513735 U | 12/2015 |
| TW | M527789 U | 9/2016 |
| TW | M529549 U | 10/2016 |
| TW | M532900 U | 12/2016 |
| TW | M544259 U | 7/2017 |
| TW | M556176 U | 3/2018 |
| WO | 0053343 | 9/2000 |
| WO | 2001097947 | 12/2001 |
| WO | 2007079270 | 7/2007 |
| WO | 2008115673 | 9/2008 |
| WO | 2008141373 A1 | 11/2008 |
| WO | 2010066543 A1 | 6/2010 |
| WO | 20100069970 | 6/2010 |
| WO | 2012145465 A1 | 10/2012 |
| WO | 2014024847 | 2/2014 |

OTHER PUBLICATIONS

Multotec, Injection Moulded TeePee Screen Panels, (Rev. 2), www.multotec.com.

Huijuan Dang, "Reinforcement of Polyurethane Elastomers with Short Fibers", Shanxi Science and Technology, Sep. 27, 2012, 6 pages.

* cited by examiner

THERMOPLASTIC COMPOSITIONS, METHODS, APPARATUS, AND USES

CROSS-REFERENCE TO RELATED APPLICATIONS

This application claims the benefit of U.S. Provisional Patent Application Ser. No. 62/492,054, filed Apr. 28, 2017, and Ser. No. 62/500,262, filed May 2, 2017, the entire contents of which are hereby incorporated by reference and the priority of which are hereby claimed.

DESCRIPTION OF EMBODIMENTS

Figure 1:
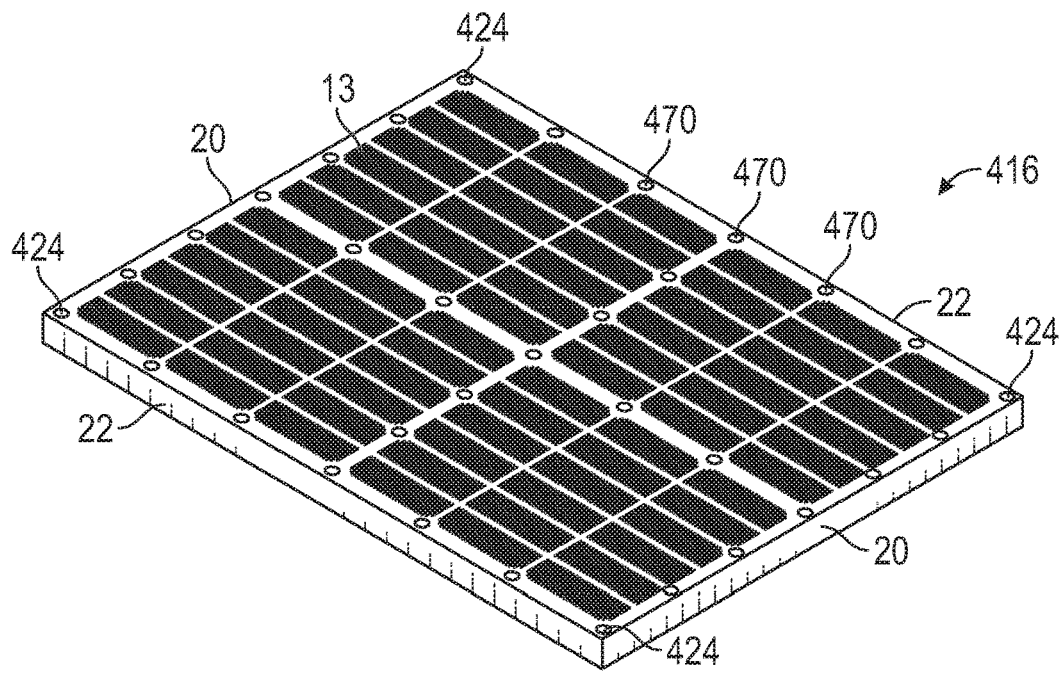
FIG. 1 is an isometric top view of a screen element, according to an embodiment.

This disclosure generally relates to compositions, apparatus, methods, and uses of thermoplastic polyurethanes (TPU). Disclosed embodiment TPU compositions may be used in injection molding processes to generate screening members for use in vibratory screening machines. Vibratory screening machines provide a capability to excite an installed screen such that materials placed upon the screen may be separated to a desired level. Oversized materials are separated from undersized materials. The disclosed compositions and screening members may be used in technology areas related to the oil industry, gas/oil separation, mining, water purification, and other related industrial applications.

Disclosed embodiments provide screening members that satisfy demanding requirements, such as: fine openings of approximately 43 µm to approximately 100 µm that effectively screen similar-sized particles; large area screens on the order of several square feet having large open screening area on the order of 30% to 35%; screens that are thermally and mechanically stable that can withstand severe conditions during operation, such as compression loading (e.g. forces from 1,500 lbs. to 3,000 lbs. applied to edges of screening members and vibrational accelerations of up to 10 G) and loading of high temperature materials (e.g. between 37° C. and 94° C.), with significant weight loads and severe chemical and abrasive conditions of the materials being screened.

Disclosed embodiment materials and methods provide a hybrid approach in which small screening elements are micro-molded using disclosed TPU materials to reliably generate fine features on the order of 43 µm to approximately 100 µm to yield screening elements having large open screening area. The disclosed TPU materials, as discussed in more detail below, include embodiments that feature optimized amounts of filler, heat stabilizer, and flow agent as additives to the appropriate thermoplastic polyurethane. These additives in turn allow for the small screen elements to be attached securely, such as via laser welding, to the subgrid structures to provide mechanical stability that may withstand the large mechanical loading and accelerations mentioned above. For example, glass fibers may be used as filler material, which allow for strengthening of the TPU material and in turn allow the screen elements to be securely attached to the subgrid structures with increased structural stability. However, addition of large amounts of glass fibers may lead to increased difficulty in laser welding, given that the refractive properties of the glass provide obstacles to the laser systems. Any amount of additive will also necessarily require dilution of the thermoplastic urethane. Similarly, a minimal but effective amount of heat stabilizer should be added, wherein the additive should be of sufficient amount to allow the end structure to withstand the addition of high-temperature materials as described above.

As discussed in more detail below, the amount of additives in the disclosed TPU compositions may also be varied based on the desired thickness T of the screening element surface elements, as discussed in detail in U.S. patent application Ser. Nos. 15/965,195 and 62/648,771, which are hereby incorporated by reference herein. For example, as discussed in U.S. patent application Ser. No. 15/965,195 in Paragraphs [00366] to [00373] and corresponding Tables 1 to 4, the thickness T of the screening element surface elements may be varied in an effort to maximize the percentage of open area on the overall screen assembly, which allows for increased effectiveness of the screening assembly when in use.

A plurality of these optimized subgrid structures may then be assembled into screening structures having large surface areas, on the order of several square feet. The screen assemblies based on the disclosed TPU compositions may be utilized, for example, in the manner described in U.S. patent application Ser. No. 15/965,195 and 62/648,771. For example, as outlined in U.S. patent application Ser. No. 15/965,195 in Paragraphs [0017] to [0021] of the Specification, the grid framework based upon the disclosed TPU compositions may provide the required durability against damage or deformation under the substantial vibratory load burdens it is subjected to when secured to a vibratory screening machine. The subgrids, when assembled to form the complete screen assembly, are strong enough not only to withstand the forces required to secure the screen assembly to the vibratory screening machine, but also to withstand the extreme conditions that may be present in the vibratory loading. As discussed in detail in Paragraphs [00280] to [00282] of the Specification of U.S. patent application Ser. No. 15/965,195, a preferred method of securing the screen elements to the subgrid may include laser welding of the fusion bars arranged on the subgrids. The disclosed TPU compositions may therefore be utilized to create the referenced vibratory screening apparatus, capable of withstanding the extreme conditions discussed herein and in U.S. patent application Ser. No. 15/965,195.

Screen assemblies based on disclosed TPU compositions may also be configured to be mounted on vibratory screening machines described in U.S. Pat. Nos. 7,578,394; 5,332,101; 6,669,027; 6,431,366; and 6,820,748. Such screen assemblies may include: side portions or binder bars including U-shaped members configured to receive over mount type tensioning members, as described in U.S. Pat. No. 5,332,101; side portions or binder bars including finger receiving apertures configured to receive under mount type tensioning, as described in U.S. Pat. No. 6,669,027; side members or binder bars for compression loading, as described in U.S. Pat. No. 7,578,394; or may be configured for attachment and loading on multi-tiered machines, such as the machines described in U.S. Pat. No. 6,431,366.

Screen assemblies and/or screening elements based on disclosed TPU compositions may also be configured to include features described in U.S. Pat. No. 8,443,984, including the guide assembly technologies described therein and preformed panel technologies described therein. Still further, screen assemblies and screening elements based on disclosed TPU compositions may be configured to be incorporated into pre-screening technologies, compatible with mounting structures and screen configurations, described in U.S. Pat. Nos. 7,578,394; 5,332,101; 4,882,054; 4,857,176; 6,669,027; 7,228,971; 6,431,366; 6,820,748; 8,443,984; and 8,439,203. The disclosure of each of these patent documents, along with their related patent families and applications, and the patents and patent applications referenced in these documents, are expressly incorporated herein by reference in their entireties.

Example Screen Embodiments

Screening members fabricated from thermosetting and thermoplastic polymers are described in the above referenced patent documents (i.e., U.S. Provisional Patent Application Ser. Nos. 61/652,039 and 61/714,882; U.S. patent application Ser. No. 13/800,826; U.S. Pat. Nos. 9,409,209; 9,884,344; and U.S. patent application Ser. No. 15/851,099), the disclosures of which are incorporated herein by reference in their entireties.

FIGS. 1 to 3A illustrate example embodiment screening members generated by injection molding processes using disclosed TPU compositions. FIGS. 1 to 1C show an embodiment screen element 416 having substantially parallel screen element end portions 20, and substantially parallel screen element side portions 22, that are substantially perpendicular to the screen element end portions 20. Screen element 416 may include a plurality of tapered counter bores 470, which may facilitate extraction of screen element 416 from a mold, as described in greater detail in the above-referenced patent documents. Screen element 416 may further include location apertures 424, which may be located at a center of screen element 416 and at each of the four corners of screen element 416. Location apertures 424 are useful for attaching screen element 416 to subgrid structures, as described in greater detail below with reference to FIGS. 3 and 3A.

Figure 1A:
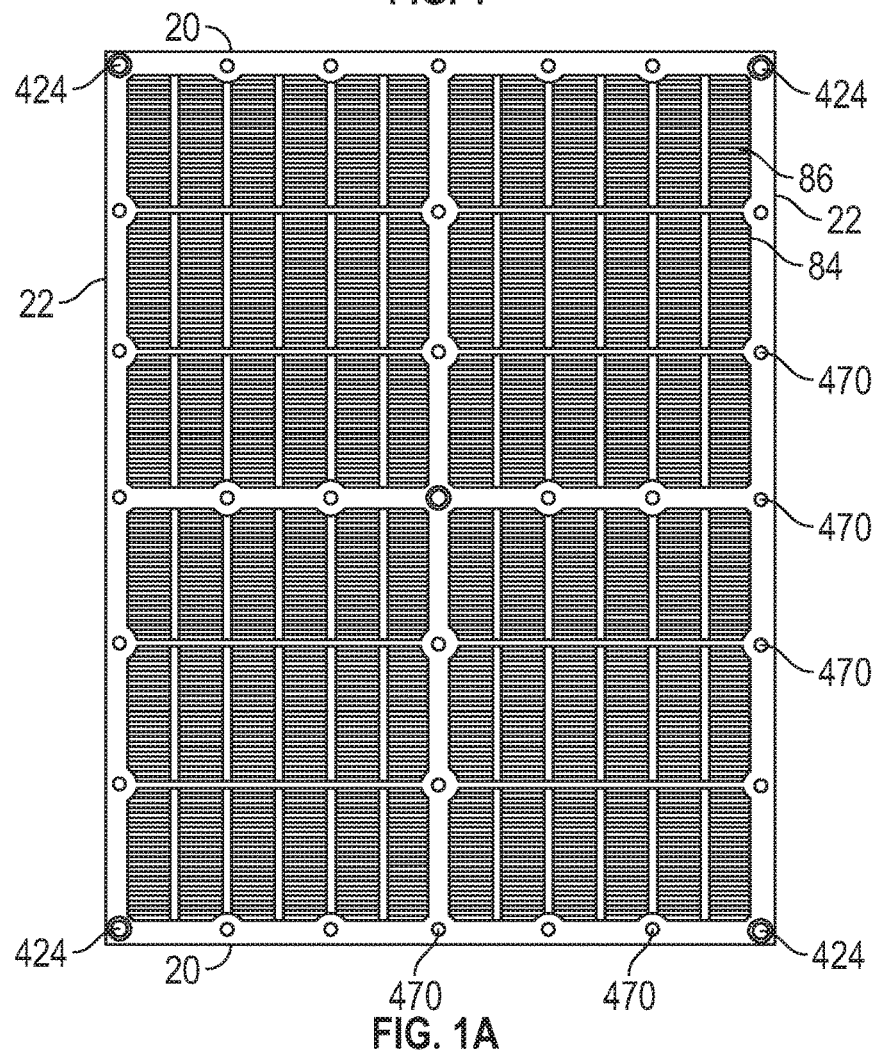
FIG. 1A is a top view of the screen element shown in FIG. 1, according to an embodiment.

As shown in FIGS. 1 and 1A, screen element 416 has a screening surface 13 that includes solid surface elements 84 running parallel to the screen element end portions 20 and forming screening openings 86, as also shown in the close-up view of FIG. 2, as described in greater detail below.

Figure 1B:
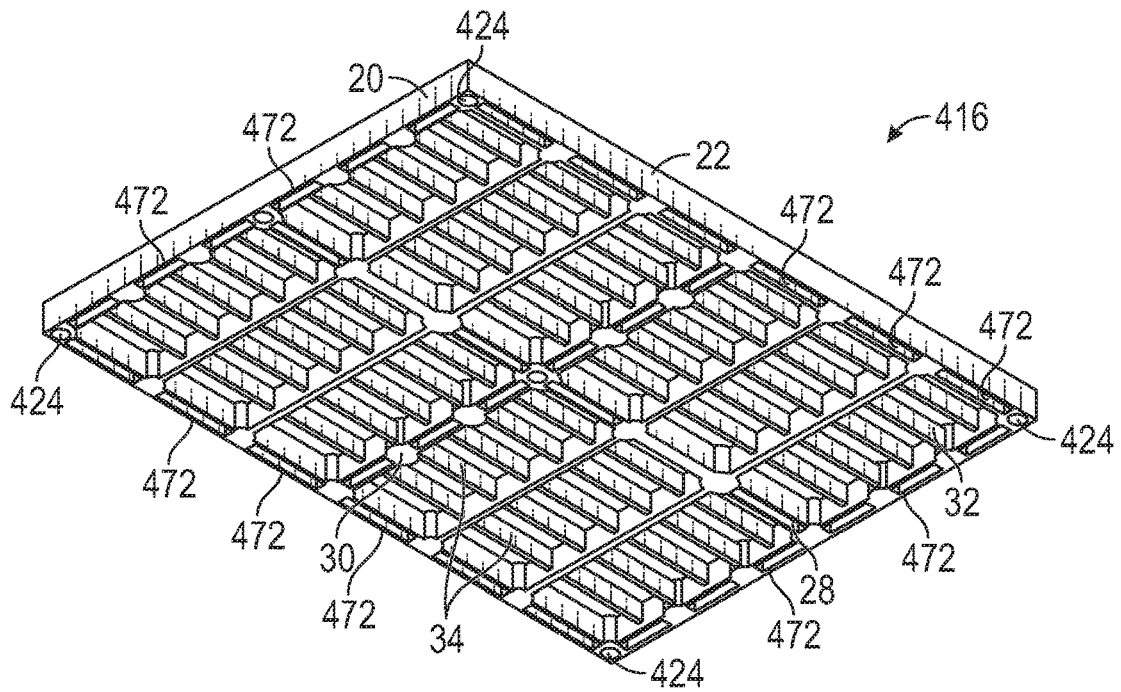
FIG. 1B is a bottom isometric view of the screen element shown in FIG. 1, according to an embodiment.
Figure 1C:
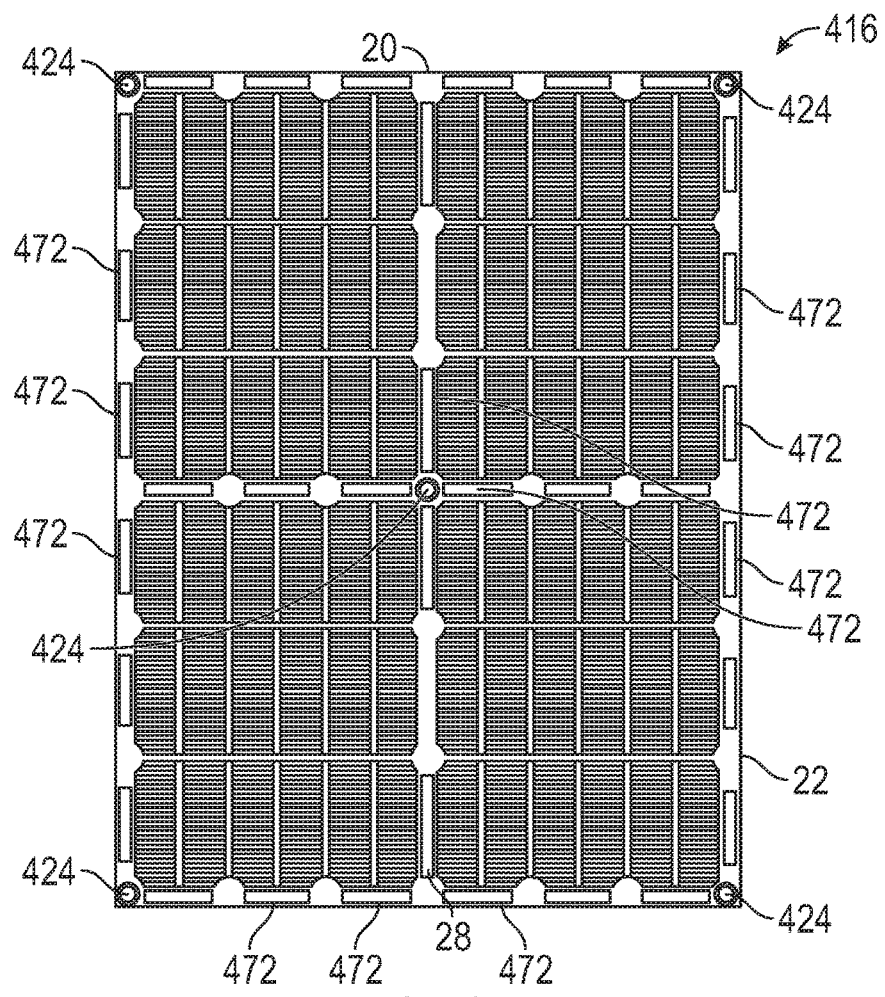
FIG. 1C is a bottom view of the screen element shown in FIG. 1, according to an embodiment.

FIGS. 1B and 1C show a bottom view of screen element 416 having a first screen element support member 28 extending between the end portions 20 and being substantially perpendicular to the end portions 20. FIG. 1B also shows a second screen element support member 30 perpendicular to the first screen element support member 28 extending between the side edge portions 22, being approximately parallel to the end portions 20 and being substantially perpendicular to the side portions 22. The screen element may further include a first series of reinforcement members 32 substantially parallel to the side edge portions 22, and a second series of reinforcement members 34 substantially parallel to the end portions 20. The end portions 20, the side edge portions 22, the first screen element support member 28, the second screen element support member 30, the first series reinforcement members 32, and the second series of reinforcement members 34, structurally stabilize the screen surface elements 84 and screening openings 86 during various loadings, including distribution of a compression force and/or vibratory loading conditions.

As shown in FIGS. 1B and 1C, screen element 416 may include one or more adhesion arrangements 472, which may include a plurality of extensions, cavities, or a combination of extensions and cavities. In this example, adhesion arrangement 472 is a plurality of cavity pockets. Adhesion arrangement 472 is configured to mate with complementary adhesion arrangements of a subgrid structure. For example, subgrid structure 414 (shown in FIGS. 3 and 3A) has a plurality of fusion bars, 476 and 478, that mate with cavity pockets 472 of screen element 416, as described in greater detail below with reference to FIGS. 3 and 3A.

Figure 2:
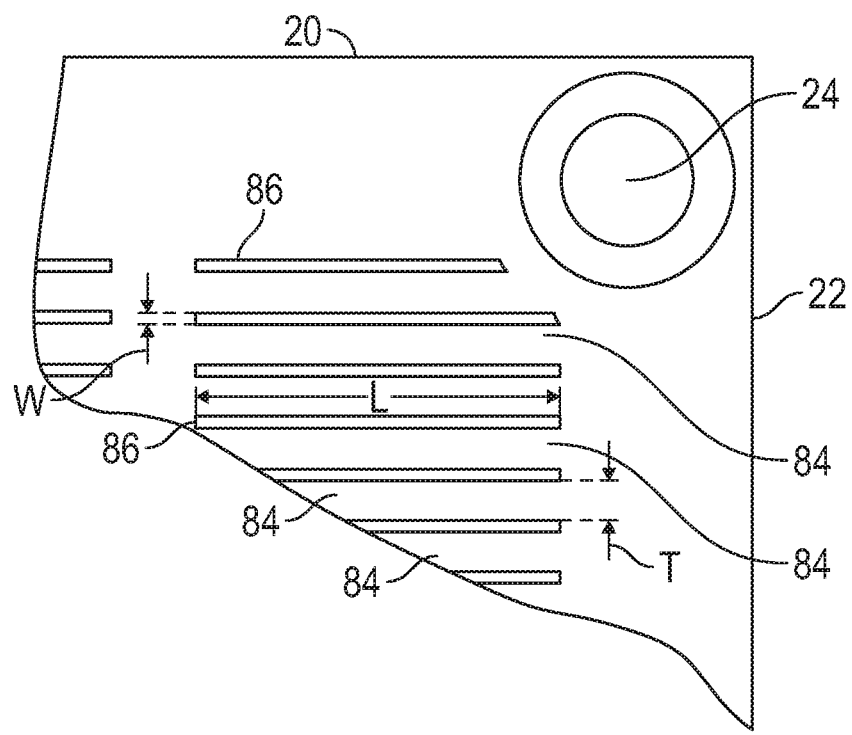
FIG. 2 is an enlarged top view of a break out portion of the screen element shown in FIG. 1, according to an embodiment.

As illustrated in FIG. 2, the screening openings 86 may be elongated slots having a length L, and width W, separated by surface elements 84 have a thickness T. Thickness T may be varied depending on the screening application and configuration of the screening openings 86. Thickness T may be chosen to be approximately 0.003 inches to about 0.020 inches (i.e., about 76 µm to about 508 µm), depending on the open screening area desired, and the width W of screening openings 86. In an exemplary embodiment, the thickness T of the surface elements may be 0.015 inches (i.e., 381 µm). However, properties of disclosed TPU compositions allow formation of thinner surface elements, such as surface elements having a thickness T of 0.007 inches (i.e., 177.8 µm). The smaller the thickness, T, of the surface elements, the larger the screening area of the screen element. For example, a thickness T of 0.014 inches will provide a screen element that is about 10-15% open, while a thickness T of 0.003 inches will provide a screen element that is about 30-35% open, thus increasing open screening area.

As mentioned above, screening openings 86 have a width W. In exemplary embodiments, the width W may be approximately 38 µm to approximately 150 µm (i.e., about 0.0015 to about 0.0059 inches) between inner surfaces of each screen surface element 84. The length-to-width ratios of the openings may be from 1:1 (i.e. corresponding to round pores) to 120:1 (i.e., long narrow slots). In exemplary embodiments, openings may preferably be rectangular and may have a length-to-width ratio of between about 20:1 (e.g. length 860 µm; width 43 µm) to about 30:1 (i.e., length about 1290 µm, and width about 43 µm). The screening openings are not required to be rectangular but may be thermoplastic injection molded to include any shape suitable to a particular screening application, including approximately square, circular, and/or oval.

As described in greater detail below, for increased stability, the screen surface elements 84 may include integral fiber materials (e.g., glass fibers) which may run substantially parallel to end portions 20. Screen element 416 may be a single thermoplastic injection molded piece. Screen element 416 may also include multiple thermoplastic injection molded pieces, each configured to span one or more grid openings. Utilizing small thermoplastic injection molded screen elements 416, which are attached to a grid framework as described below, provides substantial advantages over prior screen assemblies, as described in greater detail in the above-referenced patent documents.

Figure 3:
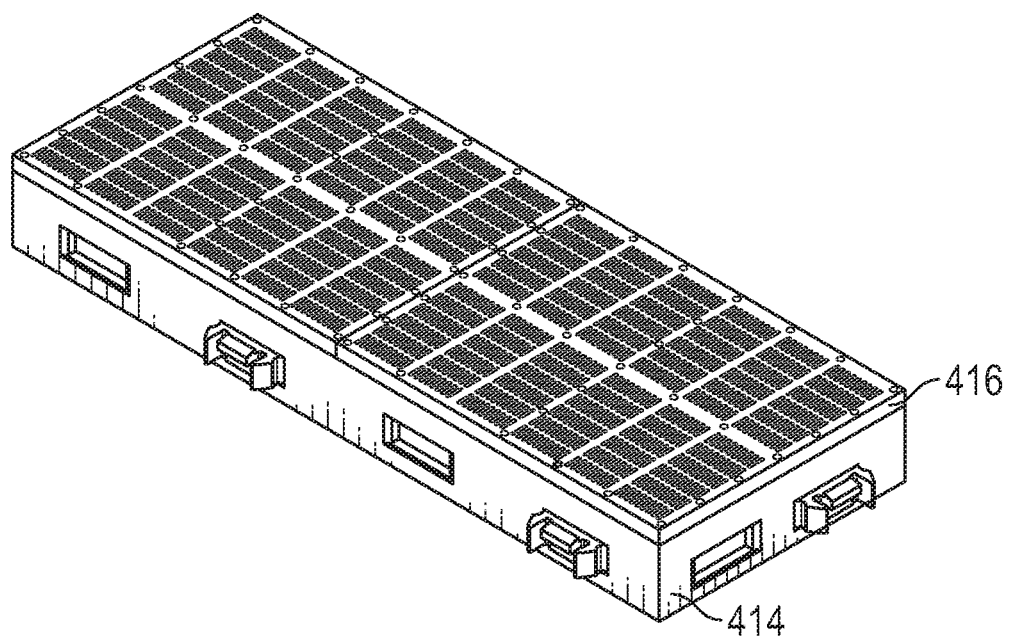
FIG. 3 is an isometric view of an end subgrid showing screen elements prior to attachment to the end subgrid, according to an embodiment.
Figure 3A:
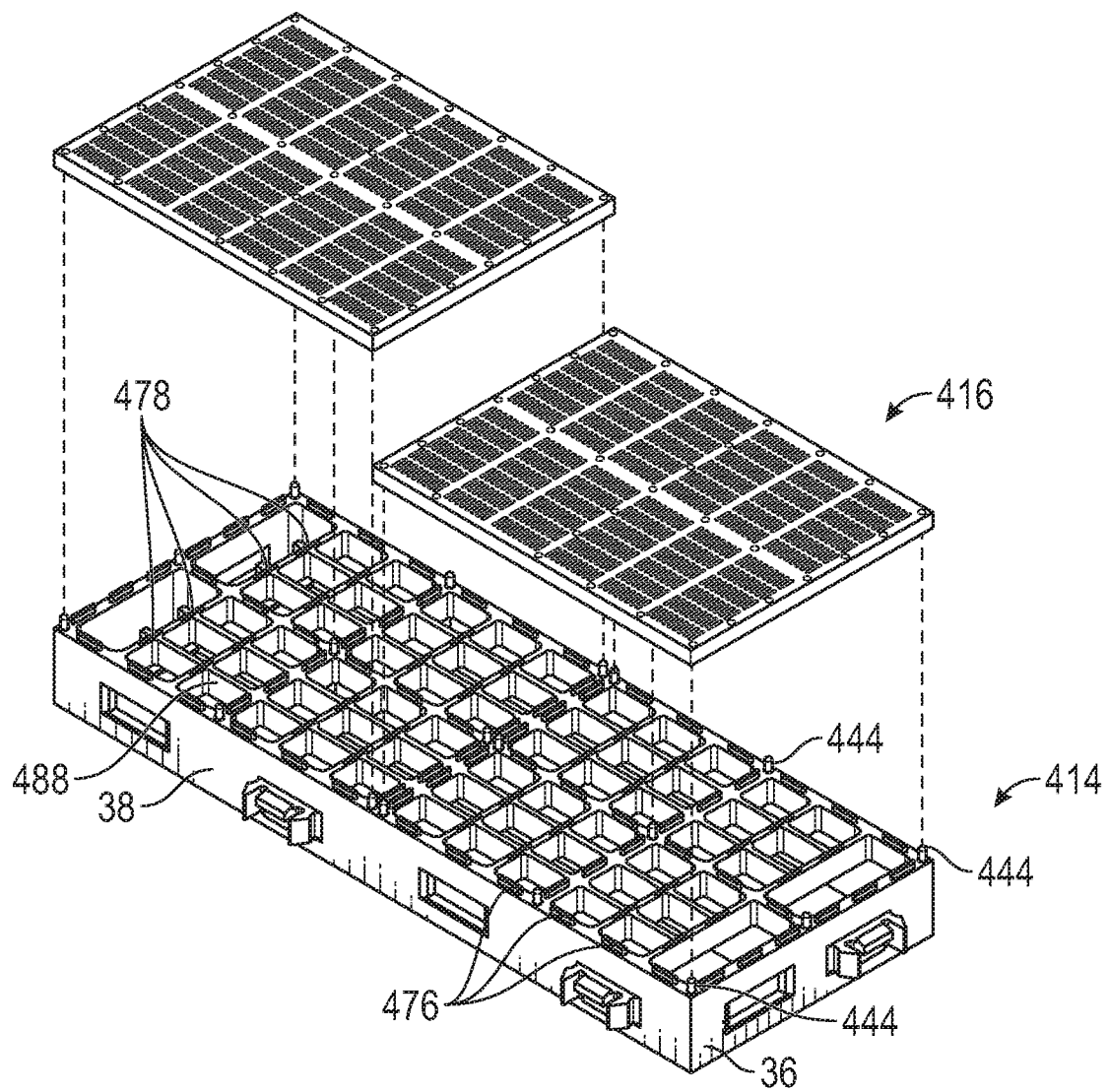
FIG. 3A is an exploded isometric view of the end subgrid shown in FIG. 3 having the screen elements attached thereto, according to an embodiment.

FIGS. 3 and 3A illustrate a process for attaching screen elements 416 to an end subgrid unit 414, according to an embodiment. Screen elements 416 may be aligned with end subgrid unit 414 via elongated attachment members 444 (of subgrid 414) that engage with location apertures 424 on an underside of the screen element 416 (e.g., see FIGS. 1 to 1C). In this regard, elongated attachment members 444 of subgrid 414 pass into screen element location apertures 424 of screen element 416. Elongated attachment members 444 of end subgrid 414 may then be melted to fill tapered bores of screen element attachment apertures 424, to thereby secure screen element 416 to the subgrid unit 414. Attachment via elongated attachment members 444 and screen element location apertures 424 is only one method for attaching screen member 416 to subgrid 414.

Alternatively, screen element 416 may be secured to end subgrid unit 414 using adhesives, fasteners and fastener apertures, laser welding, etc. As described above, fusion bars 476 and 478, of subgrid 414 (e.g., see FIGS. 3 and 3A), may be configured to fit into cavity pockets 472 of screen element 416 (e.g., see FIGS. 1 to 3C). Upon application of heat (e.g., via laser welding, etc.), fusion bars, 476 and 478, may be melted to form a bond between screen element 416 and subgrid 414 upon cooling.

Arranging the screen elements 416 on subgrids (e.g., subgrid 414), which may also be thermoplastic injection molded, allows for easy construction of complete screen assemblies with very fine screening openings. Arranging screen elements 416 on subgrids also allows for substantial variations in overall size and/or configuration of the screen assembly 10, which may be varied by including greater or fewer subgrids or subgrids having different shapes, etc. Moreover, a screen assembly may be constructed having a variety of screening opening sizes or a gradient of screening opening sizes simply by incorporating screen elements 416 with the different size screening openings onto subgrids and joining the subgrids to form a desired configuration.

The screens described above with reference to FIGS. 1 to 3, and disclosed in the above-reference patent documents, have small screening openings suitable for use as screening members. The disclosed TPU compositions additionally allow these screens to perform effectively in each of the following key areas: structural stability and durability; ability to withstand compression type loading; ability to withstand high temperatures; extended commercial life despite potential abrasion, cuts, or tearing; and fabrication methods that are not overly complicated, time consuming, or error-prone.

There is thus a need for improved TPU compositions having improved chemical properties that may be formed by injection molding into screening members and screening assemblies having improved physical properties.

Disclosed compositions generally include a TPU material, a heat stabilizer selected to optimize heat resistance of the composition, a flow agent selected to optimize use of the composition in injection molding, and a filler material selected to optimize rigidity of the resulting composite material. The filler may be included in an amount of less than about 10% by weight of the TPU. In one embodiment, the filler is provided in an amount of about 7% by weight of the TPU. In other exemplary embodiments, the filler is provided in amounts of less than about 7%, less than about 5%, or less than about 3%, of the weight of the TPU.

One example of a filler material includes glass fibers. Glass fibers may be introduced in an amount that allows use of the composition in injection molding, improves rigidity of the composition upon hardening, increases temperature resistance of the final product, and yet does not preclude laser welding of the composition to other materials.

An initial length of glass fibers may be between about 1.0 mm to about 4.0 mm. In an embodiment, glass fibers have an initial length of about 3.175 mm (i.e., ⅛ inch). Glass fibers may also have a diameter of less than about 20 µm, such as between about 2 µm and about 20 µm. In one exemplary embodiment, the glass fibers have a diameter of between about 9 µm to about 13 µm.

The TPU material may be made from a low free isocyanate monomer prepolymer. In an example embodiment, the low free isocyanate monomer prepolymer may be chosen to be p-phenylene di-isocyanate. In further embodiments, other prepolymers may be chosen. The TPU may first be generated by reacting a urethane prepolymer with a curing agent. The urethane prepolymer may be chosen to have a free polyisocyanate monomer content of less than 1% by weight.

The resulting material may then be thermally processed by extrusion at temperatures of 150° C., or higher, to form the TPU polymer. The urethane prepolymer may be prepared from a polyisocyanate monomer and a polyol including an alkane diol, polyether polyol, polyester polyol, polycaprolactone polyol, and/or polycarbonate polyol. In an example embodiment, the curing agent may include a diol, a triol, a tetrol, an alkylene polyol, a polyether polyol, a polyester polyol, a polycaprolactone polyol, a polycarbonate polyol, a diamine, or a diamine derivative.

According to an embodiment, the heat stabilizer, mentioned above, may be included in an amount of about 0.1% to about 5% by weight of the TPU. The heat stabilizer may be a sterically hindered phenolic antioxidant. The sterically hindered phenolic antioxidant may be pentaerythritol tetrakis (3-(3,5-di-tert-butyl-4-hydroxyphenyl)propionate) (CAS Registry No. 6683-19-8). Optionally, an ultraviolet (UV) light stabilizer may be included. In some embodiments, the heat stabilizer will also serve as a UV light stabilizer.

According to an embodiment, the flow agent, mentioned above, may be included in an amount of about 0.1% to about 5% by weight of the TPU. The flow agent may be chosen to be an ethylene steramide wax. The ethylene steramide wax may include octadecanamide, N,N'-1,2-ethanediylbis (CAS Registry No. 110-30-5) and stearic acid (CAS Registry No. 57-11-4). In other embodiments, other flow agents may be chosen.

According to an embodiment, glass fibers, mentioned above, may have a diameter or width between about 2 to about 20 µm, between about 9 to about 13 µm, or may have a diameter or width about 11 µm. The glass fibers may have an initial length of between about 3.1 mm to about 3.2 mm. A final average length of the glass fibers, in a hardened state after injection molding, may be less than about 1.5 mm due to breakage of fibers during processing. In a final hardened state after injection molding, the fibers may be characterized by a distribution of lengths ranging from about 1.0 mm to about 3.2 mm, with some fibers remaining unbroken.

Disclosed embodiments include methods of making and using TPU compositions suitable for use in injection molding of articles of manufacture having fine pores. Embodiment methods include reacting a TPU, a heat stabilizer, a flow agent, and a filler material, at a temperature greater than about 150° C., to generate a TPU composition. The filler may include a glass fiber having a diameter of between about 2 µm to about 20 µm, in an amount selected to optimize rigidity of articles of manufacture molded from the TPU composition. The TPU may be polycarbonate TPU. The TPU may be a pre-polymer prior to the reacting step. The glass fiber may be present in an amount between about 1% to about 10% by weight of the TPU. In one embodiment, the glass fiber may be present in an amount of about 7% by weight of the TPU.

Articles of manufacture molded from compositions disclosed herein are suitable to be joined by various methods including laser welding. In this regard, the resulting articles may be laser welded to other articles, such as support structures.

Example articles of manufacture include screening members for vibratory shaker screens, as described above. Disclosed TPU material, described above, may then be used in an injection molding process to generate a screening member. In this regard, the TPU material may be introduced/injected into a suitably designed mold at an elevated temperature. The temperature may be chosen to be a temperature at which the TPU material has a sufficiently reduced viscosity to allow the material to flow into the mold. Upon cooling, the resulting solidified screening member may be removed from the mold.

The resulting screening member may be designed to have a plurality of openings having opening widths ranging from about 38 μm to about 150 μm. Screens with such openings may be used for removing particles from various industrial fluids to thereby filter/clean the fluids. Particles that are larger than widths of screening openings may be effectively removed. The desirable thermal properties of the TPU material allows screening members made from the TPU material to effectively screen particles at elevated temperatures (e.g., service temperatures of up to about 82 to 94° C.).

Characteristics of disclosed TPU compositions, and products generated therefrom, include temperature and flow characteristics that facilitate production of very fine, high-resolution structures using techniques such as injection molding. Resulting end products also have excellent thermal stability at elevated operating temperatures (e.g. up to about 94° C.). Resulting structures also exhibit sufficient structural rigidity to withstand compression loading while maintaining small openings that allow for screening of micron-scale particulate matter. Structures generated from disclosed TPU materials also exhibit cut, tear, and abrasion resistance, as well as chemical resistance in hydrocarbon-rich environments (e.g. environments including hydrocarbons such as diesel fuel).

Thermoplastic Polyurethanes

Disclosed embodiments provide thermoplastic compositions including polyurethanes, which are a class of macromolecular plastics known as polymers. Generally, polymers, such as polyurethanes, include smaller, repeating units known as monomers. Monomers may be chemically linked end-to-end to form a primary long-chain backbone molecule with or without attached side groups. In an example embodiment, polyurethane polymers may be characterized by a molecular backbone including carbonate groups ($—NHCO_2$), for example.

While generally categorized as plastics, thermoplastic compositions include polymer chains that are not covalently bonded, or crossed linked, to one another. This lack of polymer chain crosslinking allows thermoplastic polymers to be melted when subjected to elevated temperatures. Moreover, thermoplastics are reversibly thermoformable, meaning that they may be melted, formed into a desired structure, and re-melted in whole or in part at a later time. The ability to re-melt thermoplastics allows optional downstream processing (e.g., recycling) of articles generated from thermoplastics. Such TPU based articles may also be melted at discrete locations by applying a heat source to a specific location on an article. In this regard, articles generated from disclosed TPU composition are amenable to joining using welding (e.g., laser welding) to effectively secure TPU-based screening members to suitable screening frames.

Disclosed TPU materials exhibit desirable properties under extreme conditions of temperature and harsh chemical environments. In exemplary embodiments, such TPU materials may be made from a low free isocyanate monomer (LF) prepolymer. An example (LF) prepolymer may include a p-phenylene di-isocyanate (PPDI) with low free isocyanate content. In other embodiments, different suitable prepolymers may be used.

Example TPU materials may be generated as follows. A TPU polymer may be produced by reacting a urethane prepolymer, having a free polyisocyanate monomer content of less than 1% by weight, with a curing agent. The resulting material may then be thermally processed by extrusion at temperatures of 150° C. (or higher) to form the TPU material. The urethane prepolymer may be prepared from a polyisocyanate monomer and a polyol including an alkane diol, a polyether polyol, a polyester polyol, a polycaprolactone polyol, and/or a polycarbonate polyol. The curing agent may include a diol, a triol, a tetrol, an alkylene polyol, a polyether polyol, a polyester polyol, a polycaprolactone polyol, a polycarbonate polyol, a diamine, or a diamine derivative.

Disclosed TPU materials may then be combined with a heat stabilizer, a flow agent, and a filler material, according to various embodiments. In further embodiments, other additives may be included as needed.

Generally, disclosed embodiments provide TPU compositions that may be formed by reacting a polyol with a polyisocyanate and polymer chain-extender. Example embodiments include synthetic production methods and processes for making TPU compositions. Disclosed methods may include reacting monomers, curing agents, and chain extenders in a reaction vessel to form pre-polymers. Disclosed methods may further include forming pre-polymers by reacting a di-isocyanate (OCN—R—NCO) with a diol (HO—R—OH). Formation of a pre-polymer includes chemically linking two reactant molecules to produce a chemical product having an alcohol (OH) at one position and an isocyanate (NCO) at another position of the product molecule. In an embodiment, a disclosed pre-polymer includes both a reactive alcohol (OH) and a reactive isocyanate (NCO). Articles generated using the TPU compositions disclosed herein may be fully cured polymer resins that may be stored as a solid plastic.

Disclosed embodiments provide pre-polymers that may be prepared from a polyisocyanate monomer and a curing agent. Non-limiting examples of curing agents may include ethane diol, propane diol, butane diol, cyclohexane dimethanol, hydroquinone-bis-hydroxyalkyl (e.g., hydroquinone-bis-hydroxyethyl ether), diethylene glycol, dipropylene glycol, dibutylene glycol, triethylene glycol, etc., dimethylthio-2,4-toluenediamine, di-p-aminobenzoate, phenyldiethanol amine mixture, methylene dianiline sodium chloride complex, etc.

In example embodiments, a polyol may include an alkane diol, polyether polyol, polyester polyol, polycaprolactone polyol, and/or polycarbonate polyol. In certain embodiments, the polyol may include a polycarbonate polyol either, alone or in combination with other polyols.

Heat Stabilizers

Disclosed heat/thermal stabilizers may include additives such as organosulfur compounds, which are efficient hydroperoxide decomposers that thermally stabilize polymers. Non-limiting example heat stabilizers include: organophosphites such as triphenyl phosphite, tris-(2,6-dimethylphenyl) phosphite, tris-(mixed mono- and di-nonylphenyl) phosphite etc.; phosphonates such as dimethylbenzene phosphonate, etc.; phosphates such as trimethyl phosphate, etc.; dihexylthiodiformate dicyclohexyl-10,10'-thiodidecylate dicerotylthiodiformate dicerotyl-10,10'-thiodidecylate dioctyl-4,4-thiodibutyrate diphenyl-2,2'-thiodiacetate (thiodiglycolate) dilauryl-3,3'-thiodipropionate distearyl-3,3'-thiodipropionate di(p-tolyl)-4,4'-thiodibutyrate lauryl myristyl-3,3'-thiodipropionate palmityl stearyl-2,2'-thiodiacetate dilauryl-2-methyl-2,2'-thiodiacetatedodecyl 3-(dodecyloxycarbonylmethylthio) propionate stearyl 4-(myristyloxycarbonylmethylthio) butyrate diheptyl-4,4-thiodibenzoate dicyclohexyl-4,4'-thiodicyclohexanoate dilauryl-5,5'-thio-4-methylbenzoate; and mixtures thereof etc. When present, thermal stabilizers may be included in amounts of about 0.0001% to about 5% by weight, based on the weight of the base-polymer component used in the TPU composition. Inclusion of organosulfur compounds may also improve thermal stability of TPU compositions as well as articles produced therefrom.

In an exemplary embodiment, a heat stabilizer may be a sterically hindered phenolic antioxidant, such as Pentaerythritol Tetrakis (3-(3,5-di-tert-butyl-4-hydroxyphenyl)propionate) (CAS Registry No. 6683-19-8). In example embodiments, the heat stabilizer may be included in amounts ranging from about 0.1% to about 5% by weight of the TPU.

Flow Agents

Flow agents are used to enhance flow characteristics of TPU materials so that such TPU materials may be easily injected into a mold. Injection times for disclosed TPU materials are preferably between about 1 to about 2 seconds. In an embodiment, flow times averaging about 1.6 seconds have been achieved. Flow agents are used to achieve such injection times.

Disclosed TPU compositions may include flow agents that improve lubrication to increase the flow of melted polymer compositions relative to an external surface (i.e., to increase external flow). Flow agents may also increase the flow of individual polymer chains within a thermoplastic melt (i.e., to increase internal flow).

Disclosed embodiments provide TPU compositions that may include an internal flow agent that may be readily compatible with the polymer matrix. For example the internal flow agent may have a similar polarity that improves the ease of flow of the melt by preventing internal friction between the individual particles of the polymer. In certain embodiments, TPU compositions including internal flow agents may improve molding characteristics. For example, in a specific embodiment, TPU compositions may be used to produce articles having small or very small openings. In another embodiment, TPU compositions may be used to produce articles having very fine openings by injection molding. In further embodiments, the improved flow of the TPU compositions allows production of high-resolution articles having small or very small openings.

Disclosed embodiments provide TPU compositions that may include an external flow agent that may be more or less compatible with the polymer matrix of a TPU composition. For example, an external flow agent may have a different polarity relative to the TPU composition polymer. Since external flow agents may not be compatible with the TPU polymer matrix of the composition, external flow agents may act as an external lubricating film between the polymer and hot metallic surfaces of processing machines. Thus, external lubricants may prevent a polymer melt from adhering to machine parts (e.g., such as an extruder), and may also reduce the force required to remove a cured polymer from a mold (i.e., may improve demolding) in the case of injection molding.

Non-limiting, examples of flow agents that may be included in TPU compositions include amines (e.g., ethylene bissstearamide), waxes, lubricants, talc, and dispersants. Disclosed embodiments provide TPU compositions that may also include one or more inorganic flow agents such as hydrated silicas, amorphous alumina, glassy silicas, glassy phosphates, glassy borates, glassy oxides, titania, talc, mica, fumed silicas, kaolin, attapulgite, calcium silicates, alumina, and magnesium silicates. The amount of flow agent may vary with the nature and particle size of the particular flow agent selected.

In exemplary embodiments, the flow agent may be a wax, such as an ethylene steramide wax. An ethylene steramide wax may include octadecanamide, N,N'-1,2-ethanediylbis ($C_{38}H_{76}N_2O_2$; CAS Registry No. 100-30-5) and stearic acid [$CH_3(CH_2)_{16}COOH$; CAS Registry No. 57-11-4]. In exemplary embodiments, the flow agent may be present in amounts from about 0.1% to about 5% by weight of the TPU.

Improved flow characteristics of TPU compositions may be achieved by reducing or eliminating the presence of certain compounds, such as calcium stearate, for example.

Fillers

As described above, disclosed embodiments provide TPU compositions that may also include fillers that may include inorganic materials. Fillers strengthen and stiffen the TPU based material, enhancing properties of objects injection molded from the TPU material. For example, fillers help to maintain shapes of small openings, holes, or pores, formed in objects injection molded from the TPU composition. In some embodiments, for example, the fibers allow transmission of light for use in laser welding of molded TPU components to support structures.

In exemplary embodiments, glass fibers may be used as filler material, as described above. Glass fibers may take the form of solid or hollow glass tubes. In exemplary embodiments, glass tubes may have a diameter (or width, if not round) of between about 2 µm to about 20 µm. In an exemplary embodiment, glass fibers may have a diameter (or width, if not round) of between about 9 µm to about 13 µm. In an embodiment, glass fibers may have a 11 µm diameter or width. Glass fibers may have an initial length of between about 3.0 mm to about 3.4 mm. In an exemplary embodiment, glass fibers may have an initial length of ⅛ inch (i.e., 3.175 mm). During processing of the TPU material, however, glass fibers may break and thereby become shorter. In a hardened state after injection molding, glass fibers may have an average length of less than about 1.5 mm, with a range of most fibers being between about 1.0 mm to about 3.2 mm. Some of the fibers retain their original length, but most are broken into smaller pieces.

To allow laser welding of the TPU composition, it is desirable to use as little glass fiber as possible. Too much glass fiber leads to an unacceptably high amount of reflection/refraction of laser light. Additionally, desired properties of the TPU composition may degrade with increasing glass fiber content. Glass fibers having a sufficiently large diameter may work better for laser weldable compositions. Such large diameter fibers may also provide desirable strengthening and stiffening properties. The diameter of glass fibers should not be too large, however, as desirable flow properties may degrade with increasing diameter of glass fibers, reducing the suitability of the resulting composition for injection molding.

Glass fiber filler materials should not contain fibers having a diameter of greater than 50 μm, and should preferably have a diameter of less than 20 μm, in compositions developed for injection molding of structures having features on a sub-millimeter scale. Carbon fibers should be avoided in that they may not work for laser welding because they are not translucent. TPU based objects that are designed to be joinable via laser welding may have optical properties that allow laser light to pass through the TPU material. As such, laser light may pass through the TPU object and may hit an adjacent structure such as to a nylon subgrid. The nylon material of the subgrid is a thermoplastic having a dark color that absorbs laser light and may thereby be heated by the laser. Upon absorption of laser light, the TPU and the adjacent nylon may be heated to a temperature above their respective melting temperatures. In this way, both materials may be melted and, upon cooling, a mechanical bond may be formed at an interface between the TPU and the nylon, thereby welding the components together.

Disclosed embodiments provide TPU compositions that may also include particulate fillers, which may be of any configuration including, for example, spheres, plates, fibers, acicular (i.e., needle like) structures, flakes, whiskers, or irregular shapes. Suitable fillers may have an average longest dimension in a range from about 1 nm to about 500 μm. Some embodiments may include filler materials with average longest dimension in a range from about 10 nm to about 100 μm. Some fibrous, acicular, or whisker-shaped filler materials (e.g., glass or wollastonite) may have an average aspect ratio (i.e., length/diameter) in a range from about 1.5 to about 1000. Longer fibers may also be used in further embodiments.

Plate-like filler materials (e.g., mica, talc, or kaolin) may have a mean aspect ratio (i.e., mean diameter of a circle of the same area/mean thickness) that is greater than about 5. In an embodiment, plate-like filter materials may have an aspect ratio in a range from about 10 to about 1000. In a further embodiment, such plate-like materials may have an aspect ratio in a range from about 10 to about 200. Bimodal, trimodal, or higher mixtures of aspect ratios may also be used. Combinations of fillers may also be used in certain embodiments.

According to an embodiment, a TPU composition may include natural, synthetic, mineral, or non-mineral filler materials. Suitable filler materials may be chosen to have sufficient thermal resistance so that a solid physical structure of the filler material may be maintained, at least at the processing temperature of the TPU composition with which it is combined. In certain embodiments, suitable fillers may include clays, nanoclays, carbon black, wood flour (with or without oil), and various forms of silica. Silica materials may be precipitated or hydrated, fumed or pyrogenic, vitreous, fused or colloidal. Such silica materials may include common sand, glass, metals, and inorganic oxides. Inorganic oxides may include oxides of metals in periods 2, 3, 4, 5 and 6 of groups IB, IIB, IIIA, IIIB, IVA, IVB (except carbon), VA, VIA, VIIA, and VIII, of the periodic table.

Filler materials may also include oxides of metals, such as aluminum oxide, titanium oxide, zirconium oxide, titanium dioxide, nanoscale titanium oxide, aluminum trihydrate, vanadium oxide, magnesium oxide, antimony trioxide, hydroxides of aluminum, ammonium, or magnesium. Filler materials may further include carbonates of alkali and alkaline earth metals, such as calcium carbonate, barium carbonate, and magnesium carbonate. Mineral based materials may include calcium silicate, diatomaceous earth, fuller earth, kieselguhr, mica, talc, slate flour, volcanic ash, cotton flock, asbestos, and kaolin.

Filler materials may further include alkali and alkaline earth metal sulfates, for example, sulfates of barium and calcium sulfate, titanium, zeolites, wollastonite, titanium boride, zinc borate, tungsten carbide, ferrites, molybdenum disulfide, cristobalite, aluminosilicates including vermiculite, bentonite, montmorillonite, Na-montmorillonite, Ca-montmorillonite, hydrated sodium calcium aluminum magnesium silicate hydroxide, pyrophyllite, magnesium aluminum silicates, lithium aluminum silicates, zirconium silicates, and combinations of the above-described filler materials.

Disclosed embodiments provide TPU compositions that may include fibrous fillers such as glass fibers (as described above), basalt fibers, aramid fibers, carbon fibers, carbon nanofibers, carbon nanotubes, carbon buckyballs, ultra-high molecular weight polyethylene fibers, melamine fibers, polyamide fibers, cellulose fiber, metal fibers, potassium titanate whiskers, and aluminum borate whiskers.

In certain embodiments, TPU compositions may include glass fiber fillers, as described above. Glass fiber fillers may be of E-glass, S-glass, AR-glass, T-glass, D-glass and R-glass. In certain embodiments, the glass fiber diameter may be within a range from about 5 μm to about 35 In other embodiments, the diameter of the glass fibers may be in a range from about 9 to about 20 In further embodiments, glass fibers may have a length of about 3.2 mm or less. As described above, TPU compositions including glass fillers may confer improved thermal stability to the TPU compositions and articles produced them.

Disclosed embodiments may include compositions containing a glass filler with concentrations in a range from about 0.1% to about 7% by weight. Embodiments may also include glass filler at concentrations ranging from about 1% to about 2%; about 2% to about 3%; 3% to about 4%; about 4% to about 5%; about 5% to about 6%; about 6% to about 7%; about 7% to about 8%; about 8% to about 9%; about 9% to about 10%; about 10% to about 11%; about 11% to about 12%; about 12% to about 13%; about 13% to about 14%; about 14% to about 15%; about 15% to about 16%; about 16% to about 17%; about 17% to about 18%; about 18% to about 19%; and about 19% to about 20%. In certain embodiments a glass filler concentration may be about 1%. In certain embodiments a glass filler concentration may be about 3%. In certain embodiments a glass filler concentration may be about 5%. In certain embodiments a glass filler concentration may be about 7%. In certain embodiments a glass filler concentration may be about 10%.

As described above, embodiments may include glass filler material wherein individual glass fibers may have a diameter or width in a range from about 1 μm to about 50 μm. In certain embodiments, the glass filler may be characterized by a narrow distribution of fiber diameters such that at least 90% of the glass fibers have a specific diameter or width.

Other embodiments may include a glass filler having a broader distribution of diameters or widths spanning a range from about 1 µm to about 20 µm. Further embodiments may include glass filler having a glass fiber diameter or width distribution spanning a range: from about 1 µm to about 2 µm; from about 2 µm to about 3 µm; from about 3 µm to about 4 µm; from about 4 µm to about 5 µm; from about 5 µm to about 6 µm; from about 6 µm to about 7 µm; from about 7 µm to about 8 µm; from about 8 µm to about 9 µm; from about 9 µm to about 10 µm; from about 10 µm to about 11 µm; from about 11 µm to about 12 µm; from about 12 µm to about 13 µm; from about 13 µm to about 14 µm; from about 14 µm to about 15 µm; from about 15 µm to about 16 µm; from about 16 µm to about 17 µm; from about 17 µm to about 18 µm; from about 18 µm to about 19 µm; and from about 19 µm to about 20 µm. In certain embodiments the glass filler may have a diameter or width distribution centered about a specific value. For example, the specific diameter or width value may be 10 µm±2 µm, according to an embodiment.

TPU compositions may include glass fiber fillers that include a surface treatment agent and optionally a coupling agent, according to an embodiment. Many suitable materials may be used as a coupling agent. Examples include silane-based coupling agents, titanate-based coupling agents, or a mixture thereof. Applicable silane-based coupling agents, for example, may include aminosilane, epoxysilane, amidesilane, azidesilane, and acrylsilane.

Disclosed embodiments provide TPU compositions that may also include other suitable inorganic fibers such as: carbon fibers, carbon/glass hybrid fibers, boron fibers, graphite fibers, etc. Various ceramic fibers can also be utilized such as alumina-silica fibers, alumina fibers, silicon carbide fibers, etc. Metallic fibers, such as aluminum fibers, nickel fibers, steel, stainless steel fibers, etc., may also be used.

Disclosed TPU compositions may be generated by a process in which TPU reactants may be combined with filler materials (e.g., fiber fillers) and other optional additives. The combination of materials may then be physically mixed in a mixing or blending apparatus.

An example mixing or blending apparatus may include: a Banbury, a twin-screw extruder, a Buss Kneader, etc. In certain embodiments, filler and base TPU composition materials may be mixed or blended to generate a TPU composition blend having fibers incorporated therein. The resulting TPU composition having fillers (e.g., glass fibers), and optionally other additional additives, may be cooled to generate a solid mass. The resulting solid mass may then be pelletized or otherwise divided into suitable size particles (e.g., granulated) for use in an injection molding process. The injection molding process may be used to generate an article of manufacture such as a screen or screening element.

Optional additives to TPU compositions, mentioned above, may include dispersants. In certain embodiments, dispersants may help to generate a uniform dispersion of base TPU composition and additional components such as fillers. In certain embodiments, a dispersant may also improve mechanical and optical properties of a resulting TPU composition that includes fillers.

In certain embodiments, waxes may be used as dispersants. Non-limiting examples of wax dispersants, suitable for use in disclosed TPU compositions, include: polyethylene waxes, amide waxes, and montan waxes. TPU compositions disclosed herein may include an amide wax dispersant, such as N,N-bis-stearyl ethylenediamine. The use of such a wax dispersant may increase thermal stability of the TPU composition yet may have little impact on polymer transparency. As such, inclusion of dispersants in disclosed TPU compositions may have at least to desirable effects: (1) improved thermal stability of compositions and articles produced therefrom, and (2) desirable optical properties that are suitable for downstream processing including laser welding.

Disclosed TPU compositions may further include antioxidants, according to an embodiment. Antioxidants may be use to terminate oxidation reactions, that may occur due to various weathering conditions, and/or may be used to reduce degradation of a TPU composition. For example, articles formed of synthetic polymers may react with atmospheric oxygen when placed into service. In addition, articles formed of synthetic polymers may undergo auto-oxidization due to free-radical chain reactions. Oxygen sources (e.g., atmospheric oxygen, alone or in combination with a free radical initiator) may react with substrates included in disclosed TPU compositions. Such reactions may compromise integrity of the TPU composition and articles produced therefrom. Inclusion of antioxidants, therefore, may improve chemical stability of TPU compositions as well as improving chemical stability of articles generated therefrom.

Polymers may undergo weathering in response to absorption of UV light that causes radical initiated auto-oxidation. Such auto-oxidation may lead to cleavage of hydroperoxides and carbonyl compounds. Embodiment TPU compositions may include Hydrogen-donating antioxidants (AH), such as hindered phenols and secondary aromatic amines. Such AH additives may inhibit oxidation of TPU compositions by competing with organic substrates for peroxy radicals. Such competition for peroxy radicals may terminate chain reactions and thereby stabilize or prevent further oxidation reactions. Inclusion of antioxidants in disclosed TPU compositions may inhibit formation of free radicals. In addition to AH being a light stabilizer, AH may also provide thermal stability when included in disclosed TPU compositions. Accordingly, certain embodiments may include additives (e.g., AH) that enhance stability of polymers exposed to UV light and heat. Articles generated from disclosed TPU compositions having antioxidants may, therefore, be resistant to weathering and have improved function and/or lifespan, when deployed under high-temperature conditions, relative to articles generated from TPU compositions lacking antioxidants.

Disclosed TPU compositions may further include UV absorbers, according to an embodiment. UV absorbers convert absorbed UV radiation to heat by reversible intramolecular proton transfer reactions. In some embodiments, UV absorbers may absorb UV radiation that would otherwise be absorbed by the TPU composition. The resulting reduced absorption of UV rays by the TPU composition may help to reduce UV radiation induced weathering of the TPU composition. Non-limiting example UV-absorbers may include oxanilides for polyamides, benzophenones for polyvinyl chloride (PVC), and benzotriazoles and hydroxyphenyltriazines for polycarbonate materials. In an embodiment, 2-(2'-Hydroxy-3'-sec-butyl-5'-tert-butylphenyl)benzotriazole may provide UV light stabilization for polycarbonate, polyester, polyacetal, polyamides, TPU materials, styrene-based homopolymers, and copolymers. These and other UV absorbers may improve the stability of disclosed TPU compositions and articles produced therefrom, according to various embodiments.

TPU compositions may further include anti-ozonants which may prevent or slow degradation of TPU materials caused by ozone gas in the air (i.e., may reduce ozone cracking). Non-limiting exemplary embodiments of antiozonates may include: p-Phenylenediamines, such as 6PPP (N-(1,3-dimethylbutyl)-N'-phenyl-p-phenylenediamine) or IPPD (N-isopropyl-N'-phenyl-p-phenylenediamine); 6-ethoxy-2,2,4-trimethyl-1,2-dihydroquinoline, (ETMQ) ethylene diurea (EDU), and paraffin waxes that may form a surface barrier. These and other antiozonants may improve the stability of disclosed TPU compositions as well as articles produced therefrom, according to various embodiments.

According to an embodiment, an example mixture may be prepared as follows. The starting material may be chosen to be a polycarbonate-based thermoplastic polyurethane. A filler material may be chosen to be small diameter (as described above) glass fibers included in an amount from between about 3% and about 10% by weight. A flow agent may then be chosen to be included in an amount of between about 0.1% to about 5% by weight. In this example, the flow agent may be taken to be a mixture of octadecanamide, N,N'-1,2-ethanediylbis and stearic acid. A thermal-stabilizing agent may be chosen to be pentaerythritol tetrakis(3-(3, 5-di-tert-butyl-4-hydroxyphenyl)propionate) included in an amount of between about 0.1% to about 5% by weight. The above-described thermoplastic mixture may then be injected into bulk thermoplastic rods then pelletized for downstream injection molding.

Methods

Disclosed embodiments provide methods and processes for generating TPU compositions. Disclosed methods may include reacting (i.e., linking) pre-polymer units including an alcohol (OH) and an isocyanate (NCO) to effectively "grow" and/or extend a polymer chain or backbone. For example, in an embodiment, a TPU composition may be prepared by reacting a polyurethane pre-polymer and a curing agent, typically at temperatures from about 50° C. to about 150° C., for example, or from about 50° C. to about 100° C. Temperatures outside these ranges may also be employed in certain embodiments.

Disclosed TPU compositions may be melted and formed into a desired shape, for example, by injection molding. Disclosed methods may further include a post curing step including heating the TPU material at temperatures from about 50° C. to about 200° C., or from about 100° C. to about 150° C., for a predetermined period of time. For example, TPU materials may be heated for about 1 hour to about 24 hours. Alternatively, various methods may include an extrusion step wherein a post-cured TPU composition may be extruded at temperatures from about 150° C. to about 270° C., or from about 190° C. or higher, to render the TPU composition in an intermediate form. The intermediate form may be suitable for downstream processing to generate a final form, such as a TPU based screening element.

Disclosed methods may include a variety of additional processing operations. For example, a disclosed method or process may include: reacting a polyurethane pre-polymer and a curing agent (i.e., polymerization); post curing the polyurethane; optionally grinding the material to generate a post cured polyurethane polymer in granulated form; extruding the post cured and/or optionally granulated polyurethane polymer; and optionally pelletizing the extruded TPU.

In an embodiment, the TPU composition may be generated by a process in which a pre-polymer is mixed with a curing agent at temperatures of from about 50° C. to about 150° C. to form a polymer. The method may then include heating the polymer at temperatures from about 50° C. to about 200° C. for about 1 to about 24 hours to obtain a post-cured polymer. The post-cured polymer may then optionally be ground to generate a granulated polymer. Optionally, the method may further include processing either the post-cured polymer or the granulated polymer in an extruder at temperatures from about 150° C., or higher, to yield a TPU composition. Further operations may optionally include pelletizing the TPU composition, re-melting the pelletized TPU composition, and extruding the melted TPU composition.

Disclosed methods may further include generating TPU compositions containing optional additives. In an embodiment, optional additives may include antioxidants (including phenolics, phosphites, thioesters, and/or amines), antiozonants, thermal stabilizers, inert fillers, lubricants, inhibitors, hydrolysis stabilizers, light stabilizers, hindered amine light stabilizers, UV absorbers (e.g., benzotriazoles), heat stabilizers, stabilizers to prevent discoloration, dyes, pigments, inorganic and organic fillers, organosulfur compounds, thermal stabilizers, reinforcing agents, and combinations thereof.

Disclosed methods include generating TPU compositions containing optional additives in effective amounts customary for each respective additive. In various embodiments, such optional additional additives may be incorporated into the components of, or into the reaction mixture for, the preparation of the TPU composition. In other embodiments, a base TPU composition lacking optional additives may be generated and optionally processed. Optional processing operations may include grinding TPU materials to generate a granulated material, or to form a powdered base TPU composition material to which optional additives may then be mixed prior to further processing.

In other embodiments, powdered mixtures including a base TPU composition and optional additives may be mixed, melted, and extruded to form a composition. In other embodiments, the TPU composition may be prepared through a reactive extrusion process wherein pre-polymer, curing agent, and any optional additives are fed directly into an extruder, and then are mixed, reacted, and extruded at an elevated temperature. Various alternative combinations of these formulation operations may also be employed in various embodiments.

Articles of Manufacture

Disclosed embodiments include apparatus, articles of manufacture, and products generated using TPU compositions. Non-limiting example embodiments may include coatings or adhesives, and/or articles having a predetermined three-dimensional structure upon curing after being cast or extruded into a mold. Disclosed embodiments provide TPU compositions that may exhibit significantly higher load bearing properties than other materials based on natural and synthetic rubber, for example.

In various embodiments, articles generated from disclosed TPU compositions may be thermostable. In this regard, although thermoplastics may generally be re-melted and reformed, articles produced from disclosed TPU compositions may exhibit resistance to effects resulting from thermal strain at temperatures sufficiently lower than a melting temperature. For example, articles generated from disclosed TPU compositions may retain their shape (i.e., they may exhibit modulus retention) at elevated temperatures corresponding to service conditions, including temperatures in a range from about 170° C. to about 200° C. Disclosed TPU compositions may be used to form articles that may retain their structure, mechanical strength, and overall performance at elevated temperatures.

Disclosed TPU compositions may exhibit thermal stability in a temperature range from about 160° C. to about 210° C. Embodiment TPU compositions may also exhibit thermal stability for temperatures in a range from about 170° C. to about 200° C., while further embodiments may exhibit thermal stability for temperatures in a range from about 175° C. to about 195° C. Disclosed embodiments may also provide a TPU composition that may exhibit thermal stability for temperatures near 180° C.

Disclosed embodiments include TPU compositions having favorable mechanical properties, as characterized by cut/tear/abrasion resistance data, relative to known thermoplastic compositions. In certain embodiments, improved properties may include: greater tear strength, better modulus retention at high temperature, low compression set, improved retention of physical properties over time and upon exposure to harmful environments. Certain embodiments provide TPU compositions that may have a combination of improved characteristics such as superior thermal stability, abrasion resistance, and chemical resistance (e.g., to oils and grease). In certain embodiments, articles generated from disclosed TPU compositions may have characteristics that are highly desirable for oil, gas, chemical, mining, automotive, and other industries.

In an exemplary embodiment, an example TPU composition, provided in pellet form, may be loaded into a cylinder of an injection press. Once loaded into the cylinder, the pellet may be heated for a period of time to thereby melt the TPU composition material. The injection press may then extrude the melted exemplary TPU composition material into a mold cavity according to a predetermined injection rate. The injection press may be adapted to include specialized tips and/or nozzles configured to achieve a desired injection output.

Various parameters may be controlled or adjusted to achieve desired results. Such parameters may include, but are not limited to, barrel temperature, nozzle temperature, mold temperature, injection pressure, injection speed, injection time, cooling temperature, and cooling time.

In an embodiment method, barrel temperatures of an injection molding apparatus may be chosen to range from about 148° C. to about 260° C., from about 176° C. to about 233° C., from about 204° C. to about 233° C., from about 210° C. to about 227° C., and from about 215° C. to about 235° C. Nozzle temperatures of an injection molding apparatus may be chosen to range from about 204° C. to about 260° C., from about 218° C. to about 246° C., from about 234° C. to about 238° C., and from about 229° C. to about 235° C.

In an embodiment method, injection pressure of an injection molding apparatus may be chosen to range from about 400 PSI to about 900 PSI, from about 500 PSI to about 700 PSI, from about 600 PSI to about 700 PSI, and from about 620 PSI to about 675 PSI. Injection speed of an injection molding apparatus may be chosen to range from about 1.0 cubic inch/second to about 3.0 cubic inch/second, from about 1.5 to about 2.5 cubic inch/second, from about 1.75 cubic inch/second to about 2.5 cubic inch/second, and from about 2.1 cubic inch/second to about 2.4 cubic inch/second.

In an embodiment method, injection time may be chosen to range from about 0.25 seconds to about 3.00 seconds, from about 0.50 second to about 2.50 seconds, from about 0.75 seconds to about 2.00 seconds, and from about 1.00 second to about 1.80 seconds. Moreover, the injection time may be modified to include a "hold" for a certain period of time in which injection is paused. Hold periods may be any particular time. In an exemplary embodiment, the hold time may range from 0.10 seconds to 10.0 minutes. Other hold times may be use in other embodiments.

In an embodiment method, mold temperatures may be chosen to range from about 37° C. to about 94° C., from about 43° C. to about 66° C., and from about 49° C. to about 60° C. Cooling temperatures may be gradually reduced to control curing of a disclosed TPU composition. The temperature may be gradually reduced from that of the mold temperature to ambient temperature over a period of time. The time period for cooling may be chosen to be virtually any time period ranging from second to hours. In an embodiment, the cooling time period may range from about 0.1 to about 10 minutes.

The following method describes an injection molding process that generates screening members based on disclosed TPU compositions. As described above, TPU compositions may be formed as TPU pellets. The TPU composition material may first be injected into a mold that is designed to generate a screening member. The TPU composition may then be heated to a temperature suitable for injection molding to thereby melt the TPU material. The melted TPU material may then be loaded into an injection molding machine. In an embodiment, the mold may be a two-cavity screening member mold. The mold containing the injected melted TPU material may then be allowed to cool. Upon cooling, the TPU material solidifies into a screening member shape defined by the mold. The resulting screening members may then be removed from the mold for further processing.

Development of Suitable Compositions

The above-described embodiments provide TPU compositions expressed in ranges of the various components. Improved materials were obtained by varying the composition of TPU materials and percentages of fillers, flow agents, and other additives. Screening members were generated using injection molding processes based on the various compositions. The screening members were attached to subgrid structures and assembled into large-area screening assemblies that were used in field testing applications.

Figure 4:
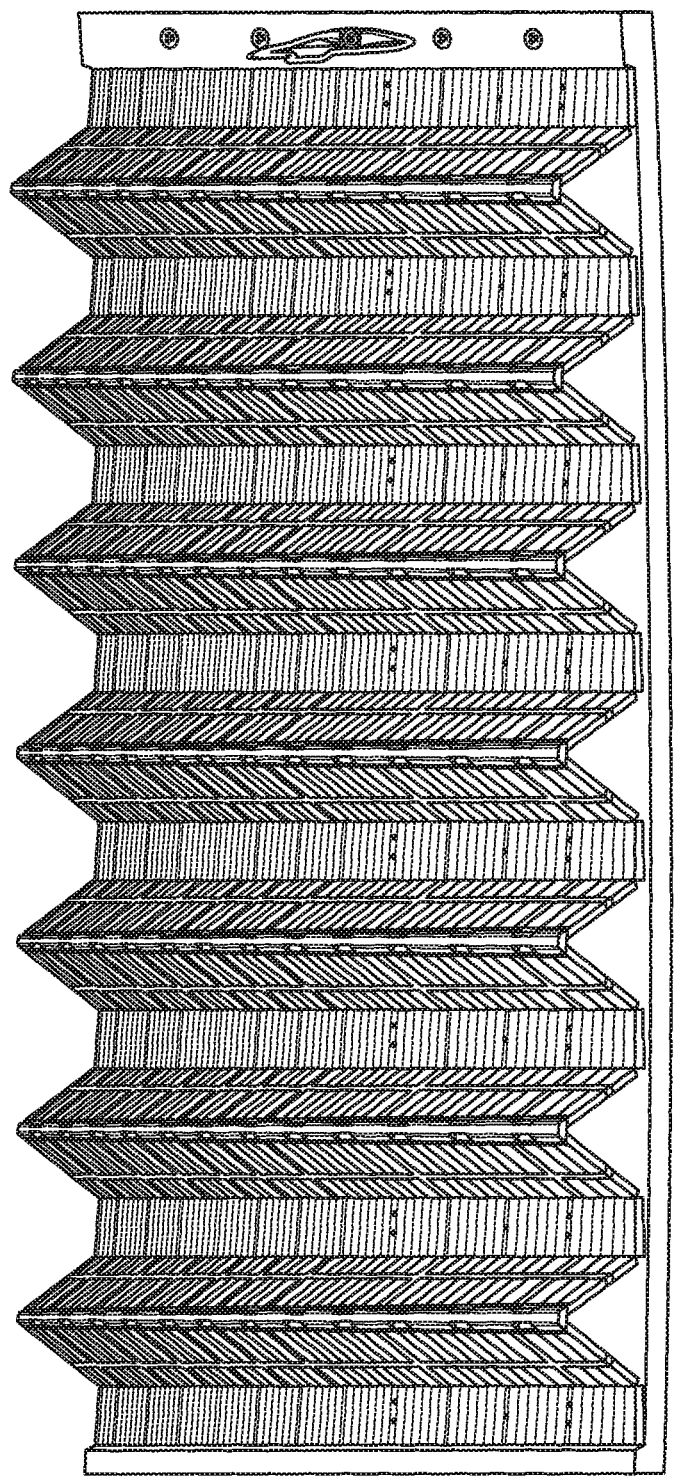
FIG. 4 illustrates an example screening assembly that was generated from screening members and subgrid structures as described below with reference to FIGS. 1 to 3A, according to an embodiment.

FIG. 4 illustrates an example screening assembly that was generated from screening members and subgrid structures as described above with reference to FIGS. 1 to 3A, according to disclosed embodiments.

Figure 5:
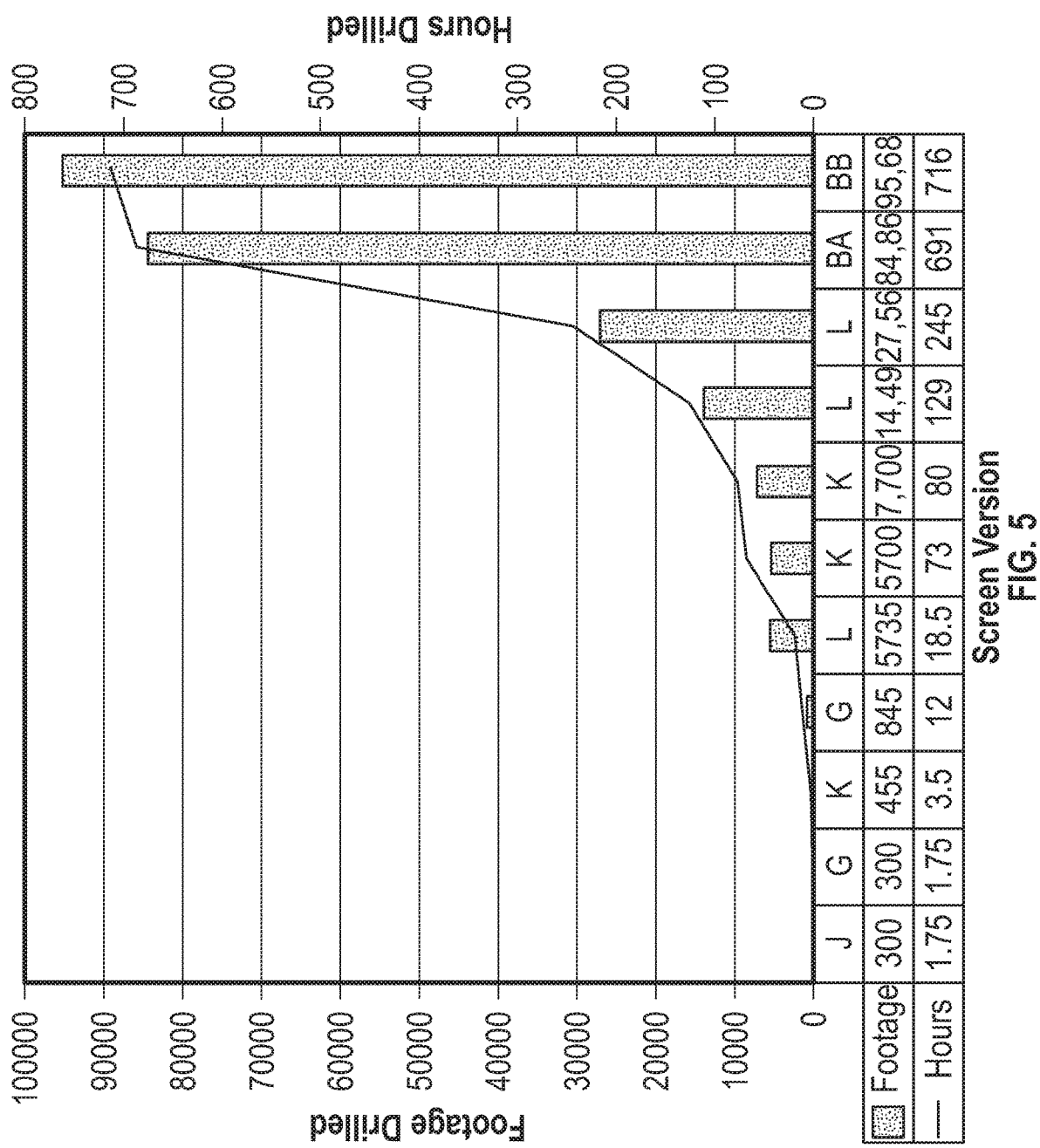
FIG. 5 illustrates results of actual field testing of screening assemblies, according to an embodiment.

FIG. 5 illustrates results of actual field testing of screening assemblies, accord to an embodiment. The data presented in FIG. 5 represents results of testing embodiment screening assemblies for screening materials produced during oil and gas exploration at depths extending to at least about 100,000 feet±5,000 feet. The best performing composition BB had a glass fiber (10 μm diameter) content of about 7%, while the next-best performing composition BA had a glass fiber (10 μm diameter) content of about 5%. Each composition also had flow agent content of about 0.5%, and a heat stabilizer content of about 1.5%. The screening element surface elements 84 (e.g., see FIG. 2) had thickness T about 0.014 inches in all of the tests for which results are presented in FIG. 5.

In additional embodiments, screening members having surface elements 84 having smaller thicknesses including T=0.007 inch, 0.005 inch, and 0.03 inch, where generated. For these embodiments, it was advantageous to use lower concentrations of filler, flow agent, and thermal stabilizers as shown in the table below.

|  | T = 0.014 inch | T = 0.007 inch | T = 0.005 inch | T = 0.003 inch |
|---|---|---|---|---|
| filler | 7% | 5% | 3% | 2% |
| heat stabilizer | 1.5% | 1.5% | 1.13% | 0.85% |
| flow agent | 0.5% | 0.5% | 0.38% | 0.28% |

Example embodiments are described in the foregoing. Such example embodiments, however, should not be interpreted as limiting. In this regard, various modifications and changes may be made thereunto without departing from the broader spirit and scope hereof. The specification and drawings are accordingly to be regarded in an illustrative rather than in a restrictive sense.

What is claimed is:

1. A screen comprising a plurality of single-piece injection molded screening elements in combination;
    each screening element including a composition including a thermoplastic polyurethane;
    wherein the screen includes openings having a size that is in a range from approximately 35 μm to approximately 150 μm and has an open screening area of from approximately 10% to approximately 35% of a total screening area; and
    the openings are generated during injection molding of the single-piece screening elements.

2. The screen of claim 1, wherein the single-piece screening elements are micro-molded.

3. The screen of claim 1, wherein the openings have a shape that is approximately rectangular, square, circular, or oval.

4. The screen of claim 1, wherein the openings are elongated slots having a substantially uniform length L along a first direction, and a substantially uniform width W along a second direction, separated by surface elements having a thickness T along the second direction.

5. The screen of claim 4, wherein the thickness T of the surface elements is in a range from approximately 0.003 inch to 0.020 inch.

6. The screen of claim 4, wherein the width W of the surface elements is in a range from approximately 0.0015 inch to approximately 0.0059 inch.

7. The screen of claim 4, wherein a length-to-width ratio L/W of the elongated slots has a value in a range from approximately 1:1 to approximately 30:1.

8. The screen of claim 4, wherein:
    the surface elements have a thickness T that is approximately 0.014 inch.

9. The screen of claim 8, wherein the open screening area is from approximately 30% to approximately 35% of a total screening area.

10. The screen of claim 1, wherein the open screening area is from approximately 30% to approximately 35% of a total screening area.

11. The screen of claim 1, wherein the open screening area is from approximately 16% to approximately 35% of a total screening area.

12. The screen of claim 4, wherein:
    the surface elements have a thickness T that is approximately 0.007 inch.

13. The screen of claim 4, wherein:
    the surface elements have a thickness T that is approximately 0.005 inch.

14. The screen of claim 4, wherein:
    the surface elements have a thickness T that is approximately 0.003 inch.

15. The screen of claim 1, wherein the open screening area in a range from approximately 10% to approximately 15% of a total screening area.

16. The screen of claim 1, wherein the thermoplastic polyurethane is obtained by a process in which a polyurethane prepolymer having a free polyisocyanate monomer content of less than 1% by weight is reacted with a curing agent and then processed by extrusion at temperatures of 150° C. or higher.

17. The screen of claim 16, wherein the urethane prepolymer is prepared from a polyisocyanate monomer and a polyol comprising an alkane diol, polyether polyol, polyester polyol, polycaprolactone polyol and/or polycarbonate polyol, and the curing agent includes a diol, triol, tetrol, alkylene polyol, polyether polyol, polyester polyol, polycaprolactone polyol, polycarbonate polyol, diamine or diamine derivative.

18. The screen according to claim 1 wherein the screen withstands applied compression forces of about 1500 to about 3000 lbs. at vibrational accelerations of up to about 10 G and temperatures up to about 94° C.

19. A screen comprising a plurality of single-piece injection molded screening elements in combination;
    each screening element including a composition including a thermoplastic polyurethane;
    wherein the screen includes openings having a size that is in a range from approximately 35 μm to approximately 150 μm and has an open screening area of from approximately 16% to approximately 35% of a total screening area; and
    the openings are generated during micro molding of the single-piece screening elements.

20. The screen of claim 19, wherein the screen withstands applied compression forces of about 1500 to about 3000 lbs. at vibrational accelerations of up to about 10 G and temperatures up to about 94° C.

21. The screen of claim 19, comprising a plurality of square feet in area.

22. The screen of claim 19, wherein the open screening area is about 30% to about 35% of the total screening area.

23. The screen of claim 19, wherein the openings range in size from approximately 43 μm to approximately 100 μm.

24. The screen of claim 19, wherein the single-piece injection molded screening elements are joined using laser welding.

25. A method of separating materials, comprising the steps of:
    providing a vibratory screening apparatus equipped with a screen;
    placing materials to be separated on the screen; and
    exciting the screen to separate the materials to a desired level;
    the screen including a plurality of single-piece injection molded screening elements in combination;
    each screening element including a composition including a thermoplastic polyurethane;
    wherein the screen includes openings having a size that is in a range from approximately 35 μm to approximately 150 μm and has an open screening area of from approximately 10% to approximately 35% of a total screening area; and
    the openings are generated during micro molding of the single-piece screening elements.

26. The method of claim 25, wherein the vibratory screening apparatus excites the screen with vibrational accelerations from about 3 G to about 10 G.

27. The method of claim 25, wherein the method is employed in at least one of the oil, gas, chemical, automotive, mining, and water purification industries.

\* \* \* \* \*